Figure 1:
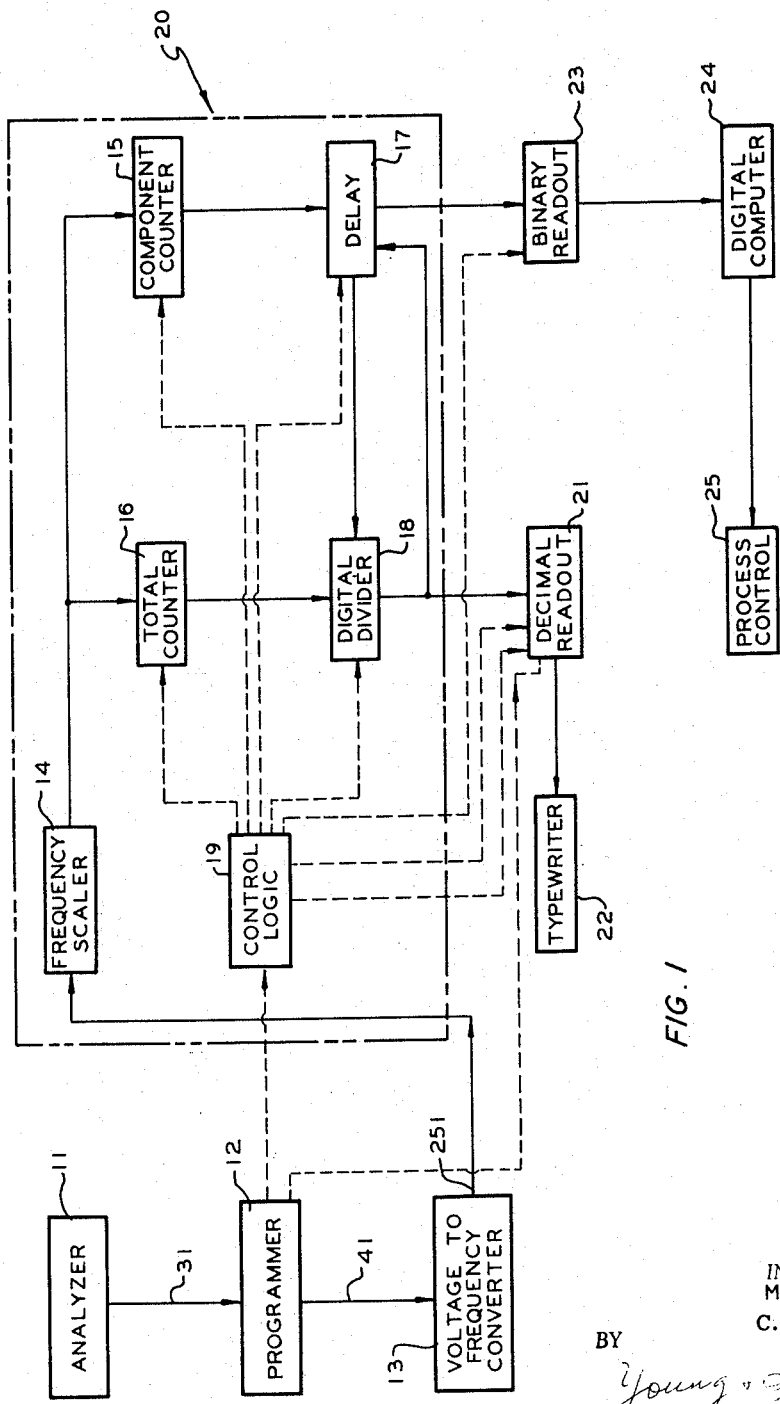

INVENTORS
M.C. BURK
C. E. JONES
BY
ATTORNEYS

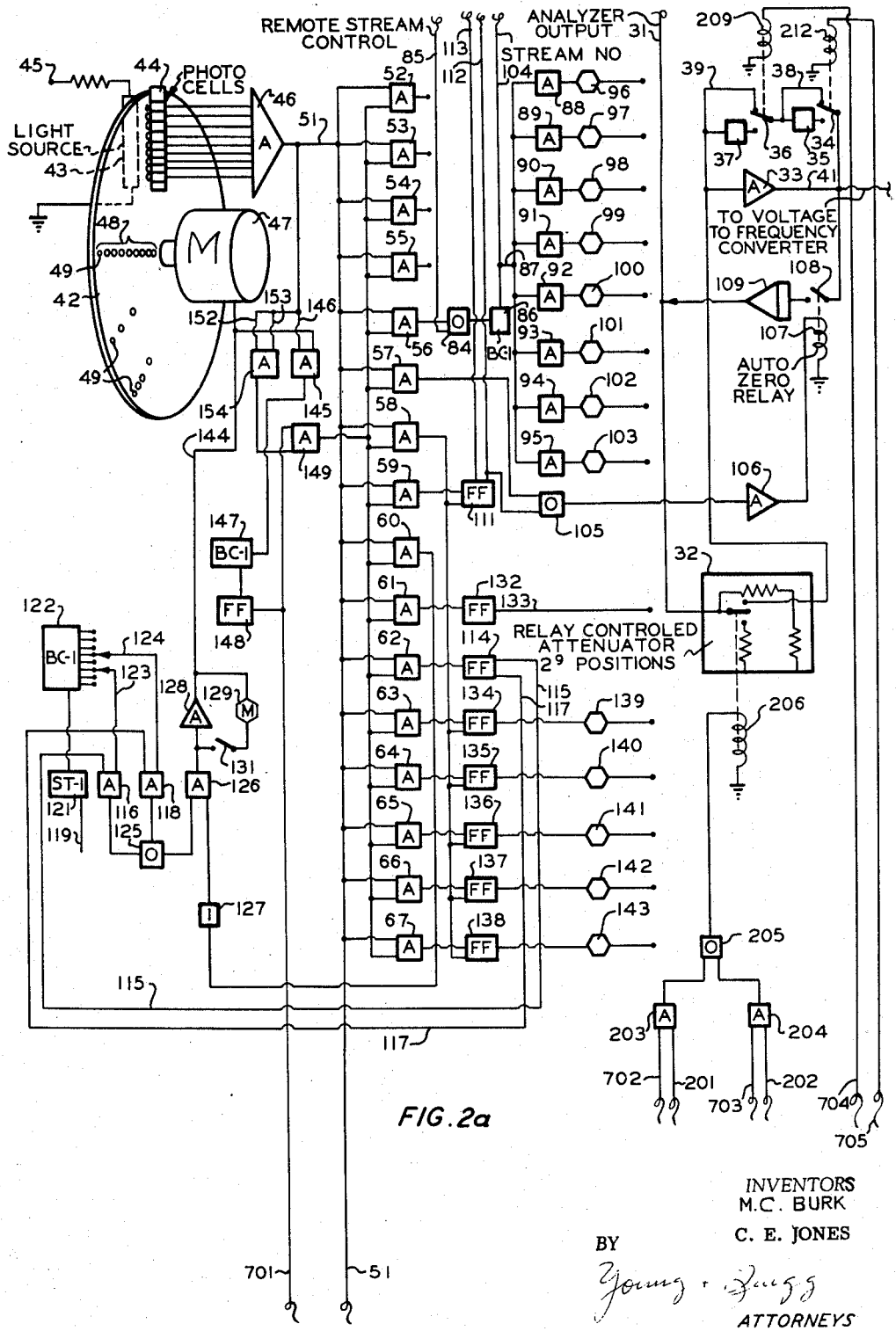

United States Patent Office 3,119,995
Patented Jan. 28, 1964

3,119,995
TIMING APPARATUS
Marvin C. Burk and Charles E. Jones, Bartlesville, Okla., assignors to Phillips Petroleum Company, a corporation of Delaware
Filed Feb. 20, 1962, Ser. No. 174,543
9 Claims. (Cl. 340—347)

This invention relates to timing apparatus. In one aspect the invention relates to timing apparatus suitable for use in measuring and recording a plurality of signals.

Several types of analytical instruments are known which provide a plurality of output signals in sequence that are representative of the individual components of a material being analyzed. One such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output voltage representative of the rate of impingement of charged particles on the collector.

Heretofore, it has been the general practice to measure or record directly the analog voltages established by the detecting circuits of such analyzers. However, these recorded voltages cannot always be identified or interpreted readily by an operator in an industrial plant. In addition, it is often difficult for an operator to calculate the concentration of individual components of a sample mixture from the recorded voltages.

In accordance with an improved system disclosed and claimed in copending application Serial No. 174,489, filed February 20, 1962, by Marvin C. Burk, C. E. Jones and Harold M. Neer, there is provided analysis apparatus comprising an analyzer adapted to provide a plurality of output voltages in sequence, each representative of a component of the material being analyzed; converter means to provide a fluctuating output signal, the frequency of which is proportional to the amplitude of the input voltage; means to apply the output voltages from said analyzer to the input of said converter means; first and second signal counting means; means to apply all of the output signals from said converter means to said first counting means so as to register the total output of said converter means; means to apply individual output signals from said converter means to said second counting means in sequence; delay means; means for applying the output signals of said second counting means to said delay means in sequence; means for dividing; means for transferring the output of said first counting means to said means for dividing, and means for transferring said second counting means output signals from said delay means to said means for dividing in sequence to divide each of said second counting means output signals by said output of said first counting means.

In accordance with the invention there is provided timing apparatus which is suitable for use with such analysis apparatus and which comprises a coded means; means for reading said coded means; means for moving said coded means past said means for reading; a source of pulse signals; counting means; means for applying the output of said source of pulse signals to an input of said counting means; said counting means having a plurality of output terminals with each of said output terminals corresponding to a different ratio of output pulses to input pulses; and means for controlling said means for moving to vary the speed of movement responsive to the output of one of said output terminals.

Accordingly it is an object of this invention to provide method and apparatus for measuring and recording a plurality of signals. Another object of the invention is to provide apparatus for measuring and recording a plurality of signals which are received in sequence. A still further object of the invention is to provide an improved method and apparatus for recording the output of analytical instruments. Another object of the invention is to provide an improved method and apparatus for programming an operation. Yet another object of the invention is to provide an improved timing apparatus.

Other aspects, objects, and advantages of the invention will become apparent from a study of the disclosure, the drawing, and the appended claims.

Figure 2B:
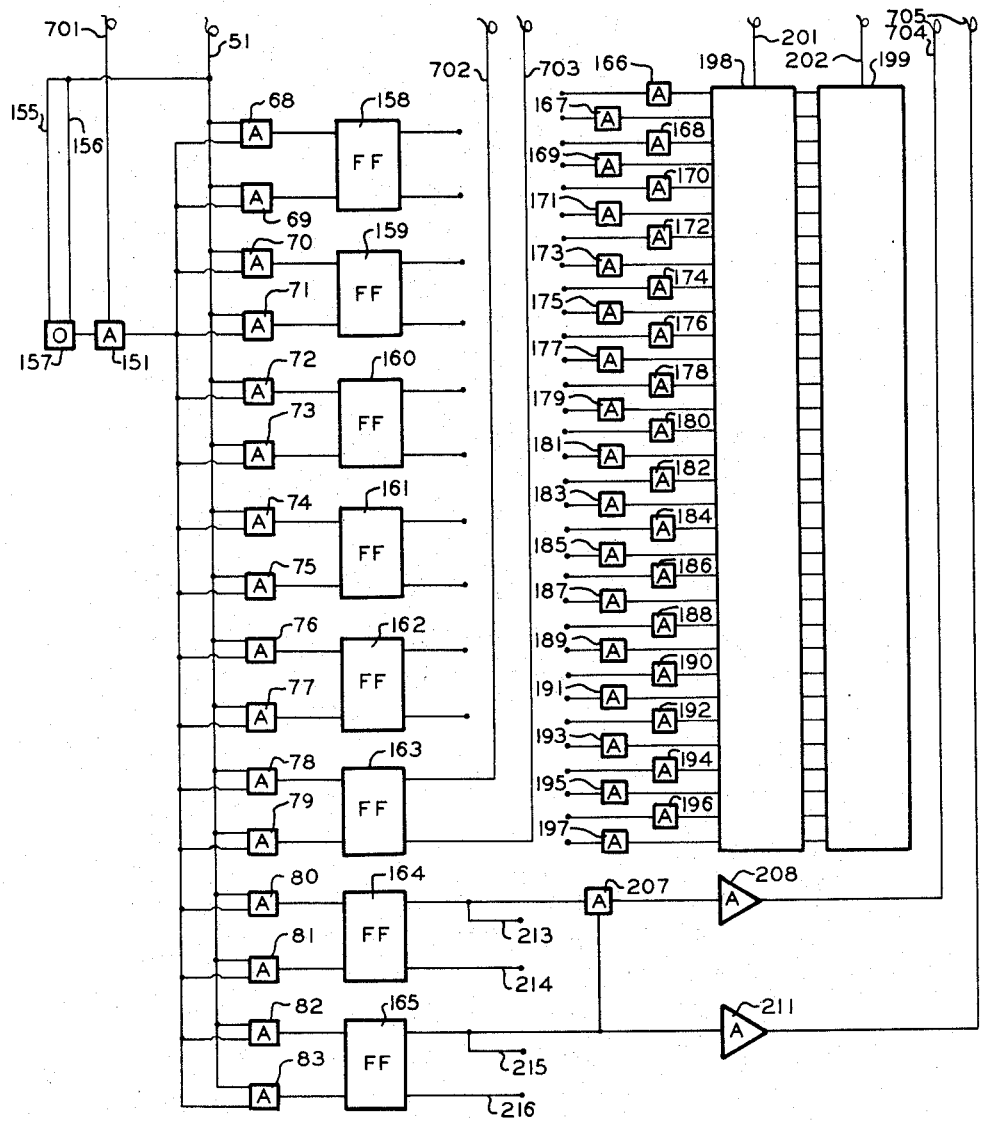

In the drawings:

FIGURE 1 is a schematic representation of an analyzing system embodying the present invention; and FIGURE 2 is a schematic representation of a programmer which can be utilized in the system of FIGURE 1.

Referring now to the drawing in detail and to FIGURE 1 in particular there is shown an analyzer 11, which can be any suitable analyzer such as a chromatographic analyzer or a mass spectrometer. The analog voltage output signal from the analyzer is transmitted to programmer 12 wherein it can be amplified, compensated for detector response, and scaled by the desired full scale range factor. A voltage-to-frequency converter 13 converts the output signal from programmer 12 to a series of pulses with a frequency proportional to the amplitude of the programmer output signal. A suitable converter for this purpose is the DY–2210 converter, manufactured by Dymec Inc., Palo Alto, California, and which is described in Control Engineering, March 1959, page 144. The number of pulses generated from the time the programmer output signal leaves the base line until it returns to the base line represents the time integral of the component peak.

The output of converter 13 is applied to the input of a frequency scaler 14. Frequency scaler 14 comprises a plurality of frequency dividing circuits such that the frequencies of the output signals from the frequency dividing circuits are preselected fractions of the frequency F of the input signal. Thus, the frequencies of the output signals of the frequency dividing circuits can be, for example F, F/2, F/4, F/8, etc. The output of frequency scaler 14 can be connected to the output of the frequency dividing circuit having the desired ratio. The output of frequency scaler 14 is connected to the inputs of component counter 15 and total counter 16. Total counter 16 counts all the pulses in the output signal of frequency scaler 14 as a measurement of the integral of all components combined. Component counter 15 counts the pulses in the output of frequency scaler 14 for a first interval corresponding to a first component as a measurement of the integral of said first component. The count corresponding to the first component is then transferred to delay 17 wherein it is stored. If more than one range factor is utilized, the range factor corresponding to the respective component is also transmitted to delay 17 along with the component count. Component counter 15 is then reset for a second interval of operation corresponding to the second component. At the end of the second interval the count is transferred from component counter 15 to delay 17 wherein it is stored and component counter 15 is again reset for another interval of operation. This procedure is repeated until the integral of each of the components has been stored in delay 17. The output of total counter 16 is then transmitted to digital divider 18. The individual component integral signals are transmitted in sequence from delay 17 to digital divider 18 wherein they are normalized by dividing each component signal by the output signal from total counter 16. The location of the decimal point for each component is determined by the respective range factor. The operation of component counter 15, total counter 16, delay 17 and digital divider 18 can be controlled by control logic system 19, which in turn can be controlled by programmer 12. Counters 15 and 16, delay 17, digital divider 18, and control logic 19 constitute normalizing computer 20.

The output of digital divider 18 is in serial pulse form with each pulse representing a certain percentage increment. The output of digital divider 18 is transmitted to the input of decimal readout system 21 wherein it is converted into a 10-line serial pulse output required by the control solenoids of typewriter 22. The 10-line serial pulse output of decimal readout 21 is transmitted along with appropriate control signals to typewriter 22. The operation of decimal readout system 21 can be controlled by signals from control logic 19 and programmer 12.

The normalized data can be returned to delay 17 for storage until needed. At a command from control logic 19, binary readout 23 can transfer the data to digital computer 24 in binary code. The output of computer 24 can be utilized in process control 25 to manipulate selected variables of a process.

Referring now to FIGURE 2 the output of analyzer 11 is transmitted through line 31 and relay controlled attenuator 32 to an input of data amplifier 33. The output of amplifier 33 is applied to a feedback circuit comprising switch 34, resistance 35, switch 36 and resistance 37. Resistances 35 and 37 are provided with bypass lines 38 and 39, respectively. For convenience in the binary operations of normalizing computer 20, range changes can be associated with factors of 8. Thus for a 100 percent range, switches 34 and 36 can be set to bypass lines 38 and 39, respectively, for a feedback of 1; for a 10 percent range, one of resistances 35 and 37 can be connected in the feedback circuit to produce a feedback of ⅛; and for a 1 percent range, both resistances 35 and 37 can be connected in the feedback circuit to produce a feedback of ¹⁄₆₄. The output of amplifier 33 is transmitted through line 41 to an input of voltage-to-frequency converter 13.

The operation of programmer 12 is controlled by coded disk 42, light source 43 and photocells 44. Light source 43 can be connected between ground and a suitable source of potential 45. While light source 43 has been illustrated as a single source, it is within the contemplation of the invention to utilize a plurality of radiation sources with a plurality of radiation detectors such as photocells 44. The outputs of photocells 44 are connected to respective inputs of amplifier 46. Disk 42 is preferably a punched paper disk driven by a timing motor 47.

A row of holes can be punched in disk 42 along any radial line, such as row 48. Each row of holes contains a timing hole 49 smaller than the other holes to insure that all of the code holes for a given row are in position before a reading is made. Any suitable number, such as eight, of code hole positions in each row can be utilized. Eight positions corresponding to 1, 2, 4, 8, 16, 32, 64, and 128 can be utilized to establish 28 or 256 different code combinations. The angular position of a row relative to the starting or reference position determines the time each operation occurs while the combination of holes in the row determines which operation occurs. Of the 256 possible combinations a suitable number, such as the first 64 (0–63) are set aside for such functions as sampling, zeroing, column switching, etc. This leaves combinations 65 to 256 for selecting one of three percentage ranges and for attenuation factors having a suitable range, such as 16 to 1. The individual outputs of amplifier 46, which for the purpose of simplicity correspond to 1, $\bar{1}$, 2, $\bar{2}$, 4, $\bar{4}$, 8, $\bar{8}$, 16, $\bar{16}$, 32, $\bar{32}$, 64, $\bar{64}$, 128 and $\overline{128}$, are transmitted through cable 51 to respective inputs of "and" circuits 52 through 83. The bar over a number signifies that that number was not present in the coded signal.

Thus, in a multiple stream sampling operation for analyzing samples from eight different sources in sequence, a single code hole (in addition to the timing hole 49) can be punched in the 4 position. When this code row passes between light source 43 and photocells 44, the photocell corresponding to the 4 position is actuated and a signal is transmitted through amplifier 46 to "and" circuit 56. The output of "and" circuit 56 is applied to one input of "or" circuit 84. A remote stream control signal can be applied through line 85 to a second input of "or" circuit 84. Upon the application of a signal to either input of "or" circuit 84, a signal is passed to counter 86, which can be any suitable counter such as binary counter module BC–1 manufactured by Packard Bell Computer Corporation. The outputs of counter 86, which represent the number of the stream to be analyzed, are transmitted through cable 87 to respective inputs of "and" circuits 88 through 95. The outputs of "and" circuits 88 through 95 are connected to solenoid drivers 96 through 103, respectively. The solenoid drivers can be any suitable device such as solid state electronic switches and relays. The "and" circuit corresponding to the stream to be analyzed passes a signal to the respective solenoid driver which in turn actuates a valve in the respective sample line to pass a sample to analyzer 11. Each time the 4 code appears on disk 42, the output of counter 86 will be advanced by one and the next sample stream valve will be actuated. The output of counter 86 can also be transmitted through line 104 to the decimal readout system 21 to be utilized as a control signal as described in said copending application Serial No. 174,489.

The output of "and" circuit 57 is connected to one input of "or" circuit 105. The output of "or" circuit 105 is amplified by amplifier 106 and passed through coil 107 to close normally opened switch 108 to connect integrator 109 between the output of amplifier 33 and the input of attenuator 32 for "zeroing" the output of amplifier 33. "And" circuit 57 can be actuated at any suitable time, such as after each component. The output of "and" circuit 59 is applied to one input of flip flop circuit 111, one output of which represents a "compute" signal hereinafter designated as "N" and which is transmitted to normalizing computer 20 along line 112 as a control signal and is also applied as an input to "or" circuit 105 to permit "zeroing" of amplifier 33 during the time after an analysis of a stream has been completed and normalizing computer 20 is determining the component percentages. The other output of flip flop circuit 111 is present during the time normalizing computer 20 is not computing and is designated hereinafter as "$\bar{N}$." The "$\bar{N}$" signal is transmitted along line 113 to normalizing computer 20 as a control signal. The output of "and" circuit 58 is applied to flip flop circuit 111 as a reset signal.

If it is desired to drive disk 42 at a first speed for selected code signals to provide sufficient time for mechanical response and to drive disk 42 at a second speed for other code signals, the output of "and" circuit 62, corresponding to the code 10, can be applied to flip flop circuit 114. A first state output of flip flop circuit 114 corresponding to a first speed is transmitted through line 115 to "and" circuit 116. The second state output of flip flop circuit 114 corresponding to the second speed is transmitted through line 117 to "and" circuit 118. A time pulse signal, such as a 60 c.p.s. signal, is applied through line 119 and pulse shaper 121 to an input of counter 122, which can be any suitable counter such as a cascade of binary counter modules manufactured by Packard Bell Computer Corporation. Counter 122 has a plurality of output terminals corresponding to predetermined fractions of the input, such as 1, ½, ¼, ⅛, ⅟₁₆, ⅟₃₂ etc. Line 123 is connected between an output terminal of counter 122 corresponding to the first desired speed and an input to "and" circuit 116. Line 124, is connected between an output terminal of counter 122 corresponding to the second desired speed and an input to "and" circuit 118. While only one flip flop circuit and two "and" circuits corresponding to a choice of two speeds have been illustrated, any suitable number can be utilized to provide the desired combination of speeds for disk 42. While the switches connecting lines 123 and 124 to selected outputs of counter 122 can be any suitable type of switch, the multiple position switch disclosed and claimed in copending application Serial No. 165,491, filed January 11, 1962, by C. E. Jones and E. H. Sholl, is preferred.

The outputs of "and" circuits 116 and 118 are applied as inputs to "or" circuit 125. The output of "or" circuit 125 is applied as an input to "and" circuit 126. The output of "and" circuit 60, corresponding to code 8, is applied through inverter 127 to an input of "and" circuit 126. Thus, whenever the code 8 is not presented on disk 42 a false signal will be passed by "and" circuit 60 to an inverter 127 where it will be inverted to a true signal which will then be applied to "and" circuit 126, thus passing the output of "or" circuit 125 to the input of amplifier 128. The code 8 can be utilized to automatically stop the operation of the programmer, if such is desired. A restart signal can be applied either manually or automatically to the input of amplifier 128 to cause disk 42 to rotate and remove the code 8 output. Amplifier 128 is provided with a feedback circuit comprising a voltage divider 129 and switch 131 to provide a suitable feedback such as 4/3. The output of amplifier 128 is transmitted to the input of timing motor 27, which can be any suitable timing motor such as the Sigma Cyclonoma Stepping Motor manufactured by Sigma Instruments Incorporated of South Braintree, Massachusetts. The number of pulses in the output of amplifier 128 can be 1, ½, ¼, ⅛, ⅟₁₆, ⅟₃₂, ⅟₆₄, etc., times the input of counter 122, when switch 131 is open and ⅓, ⅙, ⅟₁₂, ⅟₂₄, ⅟₄₈, etc., times the input to counter 122 when switch 131 is closed. Thus motor 47 can be driven at any of a plurality of different speeds by simply manipulating switch 131 and the switches connecting lines 123 and 124 to the outputs of counter 122.

The output of "and" circuit 61, corresponding to code 9, is applied as an input to flip flop circuit 132. One output of flip flop circuit 132 which represents a "signal off" and signifies that the analyzer 11 is not producing an output, is transmitted through line 133 to normalizing computer 20 as a control signal. The outputs of "and" circuits 63–67 are applied as inputs to flip flop circuits 134–138, respectively. First outputs of flip flop circuits 134–138 are applied to solenoid drivers 139–143, respectively. Solenoid drivers 139–143 can be any suitable switch device such as solid state electronic switches or relays, and can be utilized to control the input of a sample to analyzer 11, to control the application of a flushing gas, and other analyzer control functions. The output of "and" circuit 58 is applied as an input to flip flop circuits 134–138 to reset the flip flop circuits. The outputs of "and" circuits 52–55 can be utilized for any desired control function.

The output of amplifier 128 is transmitted through line 144 to an input of "and" circuit 145. A signal, corresponding to the occurrence of a timing hole 49, is transmitted through line 146 to a second input of "and" circuit 145. The output of "and" circuit 145 is transmitted to an input of binary counter 147. The output of binary counter 147 represents a preselected fraction, such as ¼, of the input to binary counter 147 and is transmitted to flip flop circuit 148. The output of flip flop circuit 148 is applied as an input to "and" circuits 149 and 151. The output of "and" circuit 149 is applied as an input to each of "and" circuits 52–67. The output of "and" circuit 151 is applied as an input to each of "and" circuits 68–83. Signals corresponding to $\overline{64}$ and $\overline{128}$ are transmitted from the output of amplifier 46 through lines 152 and 153, respectively, to first and second inputs of "and" circuit 154. The output of "and" circuit 154 is applied as an input to "and" circuit 149. Signals corresponding to 64 and 128 are transmitted from amplifier 46 through lines 155 and 156 to "or" circuit 147. The output of "or" circuit 157 is applied as an input to "and" circuit 151. Thus when the output of amplifier 46 represents a code number of 63 or less the output of "and" circuit 154 is applied to the input of "and" circuit 149 to pass the timing pulses from flip flop circuit 148 to the second inputs of "and" circuits 52–67, and the output of "or" circuit 157 is zero thus causing blocking of the timing pulses from flip flop circuit 148 by "and" circuit 151. When the output of amplifier 46 corresponds to a code number of 64 or higher the output of "or" circuit 157 is applied to "and" circuit 151 to pass the timing pulses from flip flop circuit 148 to the second input of "and" circuits 68–83 while the output of "and" circuit 154 is zero and blocks "and" circuit 149. "And" circuit 145, binary counter 147, and flip flop circuit 148 are utilized to provide a single timing pulse corresponding to each coded row in disk 42 to prevent actuation of "and" circuits 52–83 more than once for each coded row.

The outputs of "and" circuits 68 and 69 are applied as first and second inputs to flip flop circuit 158; the outputs of "and" circuits 70 and 71 are applied as first and second inputs to flip flop circuit 159; the outputs of "and" circuits 72 and 73 are applied as first and second inputs to flip flop circuit 160; the outputs of "and" circuits 74 and 75 are applied as first and second inputs to flip flop circuit 161; the outputs of "and" circuits 76 and 77 are applied as first and second inputs to flip flop circuit 162; the outputs of "and" circuits 78 and 79 are applied as first and second inputs to flip flop circuit 163; the outputs of "and" circuits 80 and 81 are applied as first and second inputs to flip flop circuit 164; and the outputs of "and" circuits 82 and 83 are applied as first and second inputs to flip flop circuit 165. The outputs of flip flop circuits 158, 159, 160, 161, and 162 are applied to selected inputs of "and" circuits 166–197 which are in turn connected to respective inputs of the 32 inputs to pin boards 198 and 199 which are in parallel. Pin boards 198 and 199 each have a suitable number of outputs, such as 9, which are transmitted through cables 201 and 202 to first inputs of "and" circuits 203 and 204, respectively. The desired attenuation factors are achieved by connecting each one of the inputs to pin boards 198 and 199 to at least one of the outputs of the respective pin board. The first output of flip flop circuit 163 is a second input to "and" circuit 203 while the second output of flip flop circuit 163 is applied as a second input to "and" circuit 204. The outputs of "and" circuits 203 and 204 are applied to the inputs of "or" circuit 205. Thus, the output of flip flop circuit 163 determines whether the attenuation factor corresponding to pin board 198 or the attenuation factor corresponding to pin board 199 is transmitted to "or" circuit 205. The output of "or" circuit 205 is passed through a relay system 206 to actuate the switches in relay controlled attenuator 32. While only two "and" circuits 203 and 204 and "or" circuit 205 and relay 206 have been illustrated for the purposes of simplicity, it is obvious that there would be one "and" circuit for each output of pin boards 198 and 199 with a second input to each of the "and" circuits corresponding to the outputs of pin boards 198 being connected to first output of flip flop circuit 163, and the second input to each of the "and" circuits corresponding to the outputs of pin board 199 being connected to the second output of flip flop circuit 163. Relay system 206 could contain the same number of relays as pin board 198 has outputs. Thus relay controlled attenuator 32 can be manipulated, for the example shown in FIGURE 2 to $2^9$ positions.

The first output of flip flop circuit 164 is connected to an input of "and" circuit 207. The first output of flip flop circuit 165 is connected to the second input of "and" circuit 207. The output of "and" circuit 207 is connected through amplifier 208 to relay 209 to actuate switch 36. The first output of flip flop circuit 165 is also connected through amplifier 211 to relay 212 to actuate switch 34. The first and second outputs of flip flop circuit 164 and the first and second outputs of flip flop circuit 165 are transmitted through lines 213, 214, 215, and 216, respectively, to normalizing computer 20 as range control signals.

The advantages of the programmer of FIGURE 2 include large storage capacity, ease of programming, conservation of space, and the application of all of the stored programmed information on the paper disk. The complete program, including attenuation factors, can be changed by simply changing the paper disk. The programmer is suitable for use with analog readout systems as well as utilization in the system of FIGURE 1. Further details of the cooperation of the programmer of FIGURE 2 in the system of FIGURE 1 are set forth in said copending application Serial No. 174,489, which is incorporated herein by reference.

Reasonable variations and modifications are possible within the scope of the disclosure, the drawing and the appended claims to the invention.

We claim:

1. Timing apparatus comprising a plurality of light sources; a plurality of light detectors; a code disk containing a plurality of code rows arranged in radial directions, each of said code rows being divided into a plurality of code areas with each code area being representative of a power of 2, at least one code area in each of said code rows containing a hole; the angular portion of a code row with respect to a reference position determining the time the respective operation occurs while the combination of holes in a code row determines which operation occurs; said disk being positioned between said light sources and said light detectors in such a manner that the code areas of a code row in a reading position will be in alignment with their respective light sources and their respective light detectors; means for rotating said disk; a source of pulse signals; counting means; means for applying the output of said source of pulse signals to the input of said counting means, said counting means having a plurality of output terminals with each of said output terminals corresponding to a different ratio of output pulses to input pulses; first and second "and" circuits; means connecting one of said output terminals to a first input of said first "and" circuit; means connecting another one of said output terminals to a first input of said second "and" circuit; an "or" circuit; means connecting the outputs of said first and second "and" circuits to first and second inputs of said "or" circuit, respectively; an amplifier; means connecting the output of said "or" circuit to a first input of said amplifier; a voltage divider; a switch; means for connecting said voltage divider and said switch in series between an output of said amplifier and a second input of said amplifier; means for controlling said means for rotating to vary the speed of rotation responsive to the output of said amplifier; and means for selectively applying a gating signal to one of said first and second "and" circuits.

2. Timing apparatus comprising a plurality of radiation sources; a plurality of radiation detectors; a coded means containing a plurality of code rows, each of said code rows being divided into a plurality of code areas, at least one code area in each of said code rows containing a hole; said coded means being positioned between said radiation sources and said radiation detectors in such a manner that the code areas of a code row in a reading position will be in alignment with their respective radiation sources and their respective radiation detectors; means for moving said coded means past said reading position; a source of pulse signals; counting means; means for applying the output of said source of pulse signals to the input of said counting means, said counting means having a plurality of output terminals with each of said output terminals corresponding to a different ratio of output pulses to input pulses; first and second "and" circuits; means connecting one of said output terminals to a first input of said first "and" circuit; means connecting another one of said output terminals to a first input of said second "and" circuit; an "or" circuit; means connecting the outputs of said first and second "and" circuits to first and second inputs of said "or" circuit, respectively; means for controlling said means for moving to vary the speed of movement responsive to the output of said "or" circuit; and means for selectively applying a gating signal to one of said first and second "and" circuits.

3. Timing apparatus comprising a plurality of light sources; a plurality of photocells; a code disk containing a plurality of code rows arranged in radial directions, each of said code rows being divided into a plurality of code areas, at least one code area in each of said code rows containing a hole; the angular position of a code row with respect to a reference position determining the time the respective operation occurs, while the combination of holes in a code row determines which operation occurs; said disk being positioned between said light sources and said photocells in such a manner that the code areas of a code row in a reading position will be in alignment with their respective light sources and their respective photocells; means for rotating said disk; a source of pulse signals; counting means; means for applying the output of said source of pulse signals to the input of said counting means, said counting means having a plurality of output terminals with each of said output terminals corresponding to a different ratio of output pulses to input pulses; first and second "and" circuits; means for selectively connecting one of said output terminals to a first input of said first "and" circuit; means for selectively connecting another one of said output terminals to a first input of said second "and" circuit; an "or" circuit; means connecting the outputs of said first and second "and" circuits to first and second inputs of said "or" circuit, respectively; means for controlling said means for rotating to vary the speed of rotation responsive to the output of said "or" circuit; and means for selectively applying a gating signal to one of said first and second "and" circuits.

4. Timing apparatus comprising a coded means; means for reading said coded means; means for moving said coded means past said means for reading; a source of pulse signals; counting means; means for applying the output of said source of pulse signals to the input of said counting means; said counting means having a plurality of output terminals with each of said output terminals corresponding to a different ratio of output pulses to input pulses; first and second "and" circuits; means for selectively connecting one of said output terminals to a first input of said first "and" circuit; means for selectively connecting another one of said output terminals to a first input of said second "and" circuit; an "or" circuit; means connecting the outputs of said first and second "and" circuits to first and second inputs of said "or" circuit, respectively; an amplifier; means connecting the output of said "or" circuit to a first input of said amplifier; a voltage divider; a switch; means for connecting said voltage divider and said switch in series between an output of said amplifier and a second input of said amplifier; means for controlling said means for moving to vary the speed of movement responsive to the output of said amplifier; and means for selectively applying a gating signal to one of said first and second "and" circuits.

5. Timing apparatus comprising a coded means; means for reading said coded means; means for moving said coded means past said means for reading; a source of pulse signals; counting means; means for applying the output of said source of pulse signals to the input of said counting means; said counting means having a plurality of output terminals with each of said output terminals corresponding to a different ratio of output pulses to input pulses; first and second "and" circuits; means for selectively connecting one of said output terminals to a first input of said first "and" circuit; means for selectively connecting another one of said output terminals to a first input of said second "and" circuit; an "or" circuit; means connecting the outputs of said first and second "and" circuits to first and second inputs of said "or" circuit, respectively; means for controlling said means for moving to vary the speed of movement responsive to the output of said "or" circuit; and means for selectively applying a gating signal to one of said first and second "and" circuits.

6. Timing apparatus comprising a plurality of light sources; a plurality of light detectors; a code disk containing a plurality of code rows arranged in radial directions, each of said code rows being divided into a plurality of code areas with each code area being representative of a power of 2, at least one code area in each of said code rows containing a hole, the angular portion of a code row with respect to a reference position determining the time the respective operation occurs, while the combination of holes in a code row determines which operation occurs; said disk being positioned between said light sources and said light detectors in such a manner that the code areas of a code row in a reading position will be in alignment with their respective light sources and their respective light detectors; means for rotating said disk; a source of pulse signals; counting means; means for applying the output of said source of pulse signals to the input of said counting means, said counting means having a plurality of output terminals with each of said output terminals corresponding to a different ratio of output pulses to input pulses; first and second "and" circuits; means connecting one of said output terminals to a first input of said first "and" circuit; means connecting another one of said output terminals to a first input of said second "and" circuit, an "or" circuit; means connecting the outputs of said first and second "and" circuits to first and second inputs of said "or" circuit, respectively; an amplifier; means connecting the output of said "or" circuit to a first input of said amplifier; a voltage divider; a switch; means for connecting said voltage divider and said switch in series between an output of said amplifier and a second input of said amplifier; means for controlling said means for rotating to vary the speed of rotation responsive to the output of said amplifier; a plurality of "and" circuits; each of said plurality of "and" circuits corresponding to a different code number; means for connecting the output of each of said plurality of light detectors to an input of selected ones of said plurality of "and" circuits so that the outputs of the light detectors ocrresponding to a particular code number are connected to the inputs of the "and" circuit corresponding to said particular code number; and means for utilizing the outputs of said plurality of "and" circuits as control signals.

7. Apparatus in accordance with claim 5 wherein said means for reading has a plurality of outputs, each being representative of a different code; further comprising a plurality of "and" circuits; means for connecting each of said plurality of outputs of said means for reading to an input of a respective one of said plurality of "and" circuits; and wherein said means for selectively applying comprises a flip flop circuit having an input and first and second outputs, means connecting the output of a first one of said plurality of "and" circuits to said input of said flip flop circuit, means responsive to the first output of said flip flop circuit for applying a gating signal to said first "and" circuit and means responsive to the second output of said flip flop circuit for applying a gating signal to said second "and" circuit.

8. Apparatus in accordance with claim 7 wherein said means for controlling comprises a third "and" circuit, means connecting the output of said "or" circuit to a first input of said third "and" circuit, means responsive to the output of a second one of said plurality of "and" circuits for applying a signal to a second input of said third "and" circuit, and means responsive to the output of said third "and" circuit for controlling said means for moving to vary the speed of movement.

9. Apparatus in accordance with claim 5 wherein said means for reading has a plurality of outputs, each being representative of a different code; further comprising a plurality of "and" circuits; means for connecting each of said plurality of outputs of said means for reading to an input of a respective one of said plurality of "and" circuits; and wherein said means for controlling comprises a third "and" circuit, means connecting the output of said "or" circuit to a first input of said third "and" circuit, means responsive to the output of one of said plurality of "and" circuits for applying a signal to a second input of said third "and" circuit, and means responsive to the output of said third "and" circuit for controlling said means for moving to vary the speed of movement.

References Cited in the file of this patent

UNITED STATES PATENTS

| | | |
|---|---|---|
| 2,567,760 | Jones et al. | Nov. 27, 1951 |
| 2,839,960 | Jones | June 24, 1958 |
| 2,910,638 | Linn | Oct. 27, 1959 |
| 3,020,534 | Jones | Feb. 6, 1962 |
| 3,043,962 | Jones | July 10, 1962 |
| 3,058,005 | Hurvitz | Oct. 9, 1962 |
| 3,065,397 | Crawford | Nov. 20, 1962 |